United States Patent
Lee

[11] 3,782,770
[45] Jan. 1, 1974

[54] TRENCHING TOOL

[76] Inventor: Mark W. Lee, 2364 Santa Ana Ave., Costa Mesa, Calif.

[22] Filed: Aug. 31, 1972

[21] Appl. No.: 285,535

[52] U.S. Cl.................................... 294/49, 172/378
[51] Int. Cl................................................ A01b 1/02
[58] Field of Search.................... 294/49, 50.6, 51; 7/14.55; 30/315, 344; 172/368, 378

[56] References Cited
UNITED STATES PATENTS

| 902,983 | 11/1908 | Manahan | 294/49 |
| 1,888,170 | 11/1932 | Hornbaker | 294/49 |
| 285,693 | 9/1883 | Shinabery | 294/49 |
| 1,124,046 | 1/1915 | Lopez | 7/14.55 |
| 2,852,996 | 9/1958 | Meyer | 172/378 |
| 2,909,385 | 10/1959 | Meredich | 294/49 |

Primary Examiner—Evon C. Blunk
Assistant Examiner—Johnny D. Cherry
Attorney—Gordon L. Peterson

[57] ABSTRACT

A trenching tool including a blade defining a recess opening in a first direction and a handle attached to the blade. First and second cutting elements are mounted on the blade and extend in a second direction which is opposite to the first direction.

9 Claims, 6 Drawing Figures

PATENTED JAN 1 1974 3,782,770
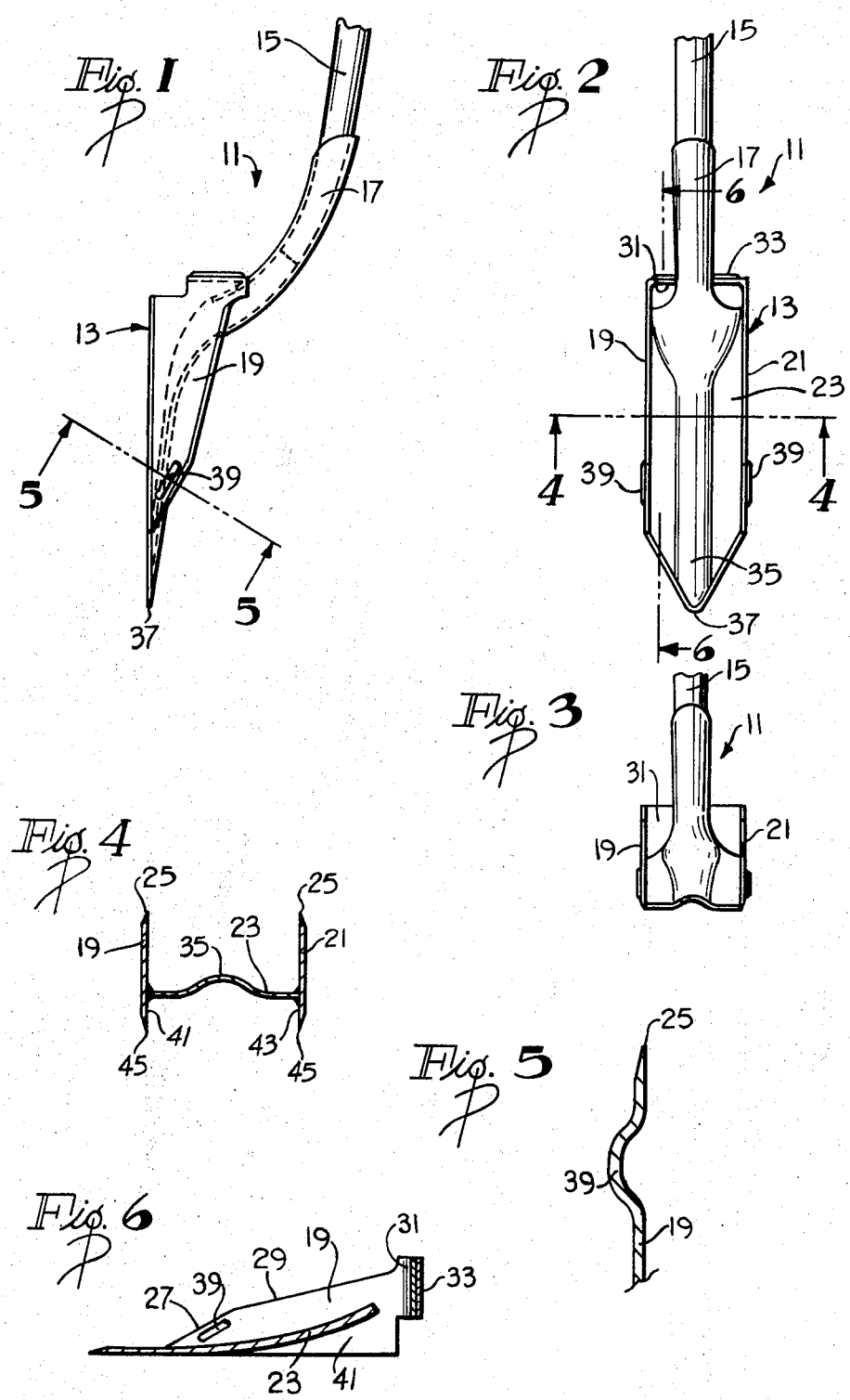

TRENCHING TOOL

BACKGROUND OF THE INVENTION

It is often necessary to manually dig a narrow trench having generally vertical and parallel side walls and a generally flat bottom. The trench may be, for example, for drainage or for underground water distribution pipes such as pipes for a sprinkling system. In this latter case, it is sometimes necessary to add a lawn sprinkler system for an existing lawn in which event the trench must be cut through sod. Although any manual digging operation is difficult, digging the trench through sod is particularly hard.

A conventional shovel is not at all suited for digging this kind of trench. A shovel is typically too large and not of the proper configuration to form a trench having generally vertical, parallel side walls and a generally flat smooth bottom. In addition, if a shovel is used to cut sod, it tends to break the sod into pieces of irregular shape which are most difficult to place back into the trench to fill the latter after the pipe has been laid.

SUMMARY OF THE INVENTION

The present invention provides a trenching tool which is particularly adapted for use in manually digging a narrow trench. To this end, the trenching tool includes an elongated, narrow blade and a handle attached to the blade. The blade defines a recess which opens in a first direction and which is adapted to receive soil therein.

First and second cutting elements are mounted on the blade and extend therefrom in a second direction which is generally opposite to the first direction. These cutting elements serve several important functions. First, the cutting elements can be used as a sod cutter before digging the trench. Secondly, when the blade is inserted into the soil, the cutting elements also enter the soil and prevent twisting of the blade. This is particularly important for a narrow blade whch may tend to twist more readily than a wider blade. Thirdly, when the cutting elements are inserted into the soil, they cut the sod behind the blade and loosen the soil thereby facilitating the next insertion of the blade into the soil.

Each of the cutting elements can advantageously take the form of an elongated plate-like member. In this form, the cutting elements also serve to strengthen the blade.

The blade is relatively narrow and of approximately the same width as the width of the desired trench. The blade includes a bottom wall and spaced parallel side walls. The side walls extend from the bottom wall in a direction opposite to the cutting elements. The side walls facilitate the digging of a trench having parallel vertical side walls. The blade has a point which projects axially beyond the side walls to facilitate the initial insertion of the blade into the soil.

To further facilitate insertion of the blade, the side walls preferably taper, and the combined width of the side walls and the plate-like members is of increasing height as they project toward the back end of the blade. The upper edges of the side walls are preferably sharpened to facilitate lifting upwardly of the blade to remove the soil.

A pressure pad is mounted on the blade at the back end of the blade. The pressure pad is located along the central axis of the shovel, i.e., along the axis of the handle and the longitudinal axis of the blade. The user can force the blade into the ground by pushing against the pressure pad with his foot. Because the pressure pad is located along the central axis of the shovel, the application of a force to the pressure pad for the purpose of insertion of the blade does not tend to twist the blade.

The plate-like members preferably are parallel to each other and substantially coplanar with the side walls, respectively. Thus, when the plate-like members are used as sod cutters, they cut a width of the sod which corresponds to the width of the blade and to the width of the trench which is to be dug.

The blade is inherently very strong against bending loads because it is generally of channel shaped cross section. In addition, the plate-like members form strengthening webs and the bottom wall of the blade can be strengthened by a longitudinally extending rib formed integrally with the bottom wall. Similarly, the side walls can be strengthened by ribs formed integrally therewith. Preferably such ribs in the side walls project slightly outwardly to slightly widen the cut made by the blade and reduce the drag on the side wall of the blade.

The invention can best be understood by reference to the following description taken in connection with the accompanying illustrative drawing.

BRIEF DESCRIPTION OF THE DRAWING

FIG. 1 is a fragmentary side elevational view of a trenching tool constructed in accordance with the teachings of this invention.

FIG. 2 is a fragmentary front elevational view of the trenching tool.

FIG. 3 is a fragmentary top plan view of the trenching tool.

FIG. 4 is an enlarged sectional view taken generally along line 4—4 of FIG. 2.

FIG. 5 is an enlarged fragmentary sectional view taken generally along line 5—5 of FIG. 2.

FIG. 6 is a sectional view taken generally along line 6—6 of FIG. 2.

DESCRIPTION OF THE PREFERRED EMBODIMENT

FIGS. 1-3 show a trenching tool 11 which generally comprises a blade 13, an elongated handle 15, and a connector 17 for attaching the handle to the blade. The handle 15 may be constructed of wood or other suitable material and may be of any desired length and configuration. The longitudinal axes of the handle 15 and the blade 13 are aligned as viewed in front elevation (FIG. 2.)

The blade 13 is preferably constructed of a strong hard material such as steel. The blade 13 includes a pair of spaced parallel side walls 19 and 21 joined by a bottom wall 23. As shown in FIG. 4, the side walls 19 and 21 are generally perpendicular to the bottom wall 23. Each of the side walls 19 and 21 has a relatively sharp upper edge 25. Each of the side walls 19 and 21 has a tapered region 27 and a tapered region 29 (FIG. 6) to facilitate insertion of the blade 13 into the ground.

The side walls 19 and 21 are integrally joined by a web 31 which extends at right angles to the side walls. The web 31 has a layer 33 of high friction material such as rubber adhered thereto. The web 31 and/or the layer 33 form a pressure pad for engagement by the foot of the user. The pressure pad extends across the central region of the back end of the blade 13 so that application of a force thereto will not tend to pivot the blade about its axis.

The bottom wall 23 is suitably affixed to the side walls 19 and 21 and may be integral therewith. The bottom wall 23 has a longitudinally extending rib 35 formed integrally therewith and extending for the full length of the bottom wall along the longitudinal axis of the blade 13. The rib 35 stiffens the bottom wall 23. The connector 17 may be formed integrally with the bottom wall 23 and blends into the rib 35. The bottom wall 23 projects axially beyond the side walls 19 and 21 at the forward end of the blade 13 to define a point 37. Although this region of the bottom wall 23 could be of various configurations, in the embodiment illustrated, it is generally triangular in plan.

Each of the side walls 21 and 23 has a rib or dimple 39 formed integrally therein. The ribs 39 project outwardly of the plane of their respective side walls 19 and 21 and extend along the tapered regions 27.

The trenching tool 11 also includes a pair of cutting elements 41 and 43 which project from the bottom wall 23 in a direction opposite to the direction in which the side walls 19 and 21 project. The cutting elements 41 and 43 terminate in relatively sharp edges 45. Although the cutting elements 41 and 43 could be constructed in different ways, in the embodiment illustrated, the cutting elements are plate-like and are formed integrally with the side walls 19 and 21. The cutting elements 41 and 43 are of progressively increasing widths as they extend from the forward end toward the back end of the blade 13 as shown in FIG. 6. In the specific construction illustrated, the width of the cutting elements 41 and 43 is increased by virtue of the bottom wall 23 being inclined relative to the edges 45 of the cutting elements 41 and 43.

In use, the blade 13 is positioned with the point 37 directed toward the soil in which the trench is to be formed. The user then places his foot on the high friction layer 33 and applies a downward force to the blade 13. The high friction layer prevents slippage between the user's foot and the blade 13. Because the web 31 and the high friction layer 33 extend across a central region of the back end of the blade 13, this force does not tend to twist the blade, and accordingly the blade can be readily forced straight into the ground.

The point 37 on the bottom wall 23 and the tapered configuration of the side walls 19 and 21 (as viewed in FIG. 1) facilitate insertion of the blade 13 into the ground. The ribs 39 adjacent the forward ends of the side walls 19 and 21 widen the cut made by the blade 13 and reduce friction between the soil and the remainder of the side walls. The side walls 19 and 21 and the cutting elements 41 and 43 prevent twisting of the blade 13 after it has been inserted into the ground. In addition, the cutting elements 41 and 43 cut and loosen the ground behind the bottom wall 23.

After the blade 13 has been inserted to the desired depth, the user manipulates the handle 15 to remove the soil and initiate formation of the trench. This is preferably done by exerting a downward and rearward force on the handle so as to produce a prying motion and force the cutting elements 41 and 43 into the soil rearwardly of the blade. Because the side walls 19 and 21 are perpendicular to the bottom wall 23 and parallel, the sides of the resulting trench will be substantially vertical. The second insertion of the blade 13 into the ground and its subsequent manipulation is facilitated by the action of the cutting elements 41 and 43 during the immediately prior insertion and manipulation of the blade. This is particularly advantageous when the trenching tool 11 is used for cutting a trench in sod. If desired, the cutting elements 41 and 43 with their sharp edges 45 can be run over the desired path of the trench to cut the sod.

The blade 13 is very strong because of its channel-shaped configuration. The web 31, the ribs 35 and 39, and the connector 17 also serve to strengthen the blade 13.

Although an exemplary embodiment of the invention has been shown and described, many changes, modifications and substitutions may be made by one having ordinary skill in the art without necessarily departing from the spirit and scope of this invention.

I claim:

1. A trenching tool comprising:
a blade having an edge adapted to penetrate soil, said blade defining a recess opening in a first direction and adapted to receive soil therein, said blade having a forward end and a back end;
an elongated handle;
means for attaching the handle to the blade to facilitate manual manipulation of the blade;
first and second cutting elements mounted on said blade and extending therefrom in a second direction, said second direction being generally opposite said first direction;
said cutting elements being spaced apart, each of said cutting elements terminating in a cutting edge adapted to penetrate soil;
said first and second cutting elements including first and second plate-like members, respectively, said blade having substantially parallel side edges, said first and second plate-like members being attached to and extending substantially along said side edges, respectively, whereby said first and second plate-like members are generally parallel;
said blade including first and second side walls joined by a bottom wall, said side walls being generally parallel to each other and to said plate-like members, said side walls defining said side edges, respectively; and
said first and second side walls being substantially coplanar with said first and second plate-like members, respectively, said side walls and said first and second plate-like members projecting in opposite directions from said bottom wall, each of said plate-like members extending a greater distance from said bottom wall near the back end of the blade then near the front end of the blade.

2. A trenching tool as defined in claim 1 wherein said bottom wall projects from said side walls at said front end of the blade and terminates in a relatively sharp soil penetrating point and said trenching tool includes a pressure pad adjacent the back end of the blade and located centrally with respect to the longitudinal axis of the blade.

3. A trenching tool as defined in claim 2 including first and second ribs in said first and second side walls, respectively, adjacent the forward ends of the side walls, and a longitudinally extending rib formed integrally in said bottom wall and extending longitudinally of the blade along a central region of the bottom wall.

4. A trenching tool as defined in claim 3 wherein the combined height of the plate-like members and the side walls is of less height near the front end of the blade than near the back end of the blade.

5. A trenching tool comprising:

a blade having an edge adapted to penetrate soil, said blade defining a recess opening in a first direction and adapted to receive soil therein, said blade having a forward end and a back end;

an elongated handle;

means for attaching the handle to the blade to facilitate manual manipulation of the blade;

first and second cutting elements mounted on said blade and extending therefrom in a second direction, said second direction being generally opposite said first direction;

said cutting elements being spaced apart, each of said cutting elements terminating in a cutting edge adapted to penetrate soil; and said blade being elongated and including a pair of generally parallel side walls and a bottom wall joining said side walls, said side walls at least partially defining said recess, said side walls and said cutting elements extending in generally opposite directions.

6. A trenching tool comprising:

a blade having an edge adapted to penetrate soil, said blade defining a recess opening in a first direction and adapted to receive soil therein, said blade having a forward end and a back end;

an elongated handle;

means for attaching the handle to the blade to facilitate manual manipulation of the blade;

first and second plate-like cutting elements mounted on said blade and extending therefrom in a second direction, said second direction being generally opposite said first direction;

said cutting elements being spaced apart, each of said cutting elements terminating in a cutting edge adapted to penetrade soil; and said cutting edges extending generally in the direction from the forward end to the back end of the blade.

7. A trenching tool as defined in claim 6 wherein said blade includes a bottom wall and first and second parallel side walls projecting from said bottom wall, said side walls being perpendicular to said bottom wall.

8. A trenching tool as defined in claim 7 wherein the first and second plate-like cutting elements are substantially coplanar with said first and second side walls, respectively.

9. A trenching tool as defined in claim 6 including a pressure pad across the central region of the back end of the blade to permit the blade to be inserted into the soil under pressure of the user's foot.

* * * * *